July 16, 1968     M. L. HAUPTMAN     3,392,604

SPEED CHANGING MECHANISM

Filed March 16, 1966

INVENTOR.
Murray L. Hauptman
BY
*Barnes, Dickey & Pierce*
ATTORNEYS.

United States Patent Office 3,392,604
Patented July 16, 1968

3,392,604
SPEED CHANGING MECHANISM
Murray L. Hauptman, 24501 Harding,
Oak Park, Mich. 48237
Filed Mar. 16, 1966, Ser. No. 534,736
7 Claims. (Cl. 74—798)

ABSTRACT OF THE DISCLOSURE

A planetary friction drive utilizing helically wound springs as planets in order that high efficiency may be maintained despite slight irregularities, in either an axial or circumferential direction, which may appear on the surfaces of the inner and outer races.

This invention relates to speed changing mechanisms, and more particularly to devices of the planetary or epicyclic type for transmitting rotational forces at altered speeds, and which have cylindrical inner and outer races with planetary rollers.

It is an object of the invention to provide a novel and improved speed changing mechanism of this type which will maintain high efficiency despite slight irregularities in either an axial or circumferential direction, which may appear on the surfaces of the inner or outer races.

It is a further object to provide a planetary speed changing mechanism of this character in which the planetary rollers will have a minimum loss of tightness or compression due to diametral wear during operation.

Figure 1:
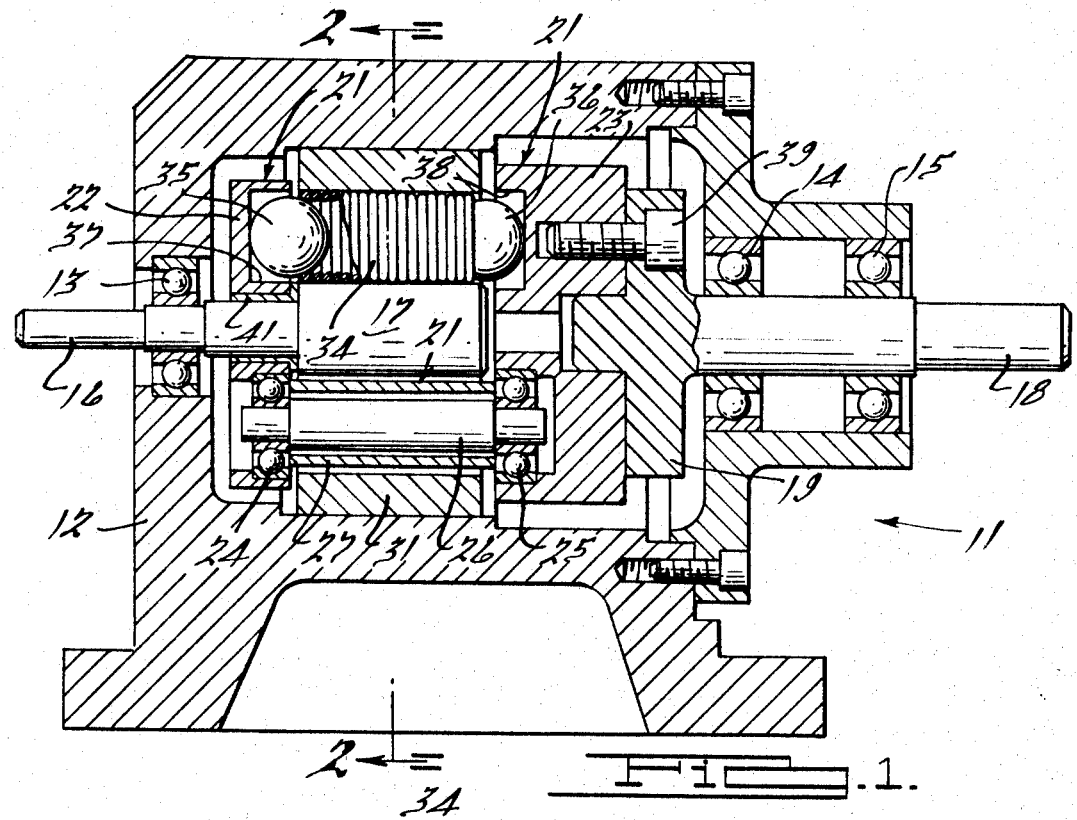
Figure 2:
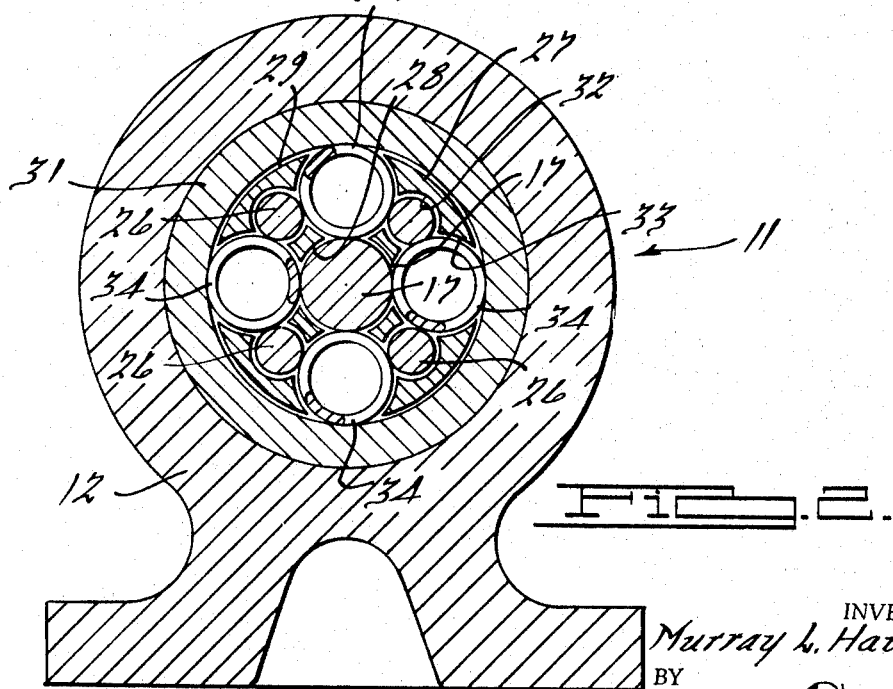

Other objects, features and advantages of the present invention will become apparent from the subsequent description and the appended claims, taken in conjunction with the accompanying drawings, in which:

FIGURE 1 is a cross-sectional view in elevation showing the speed changing mechanism of this invention, and FIGURE 2 is a cross-sectional view taken along line 2—2 of FIGURE 1 and showing further details of the construction.

Briefly, the illustrated embodiment of the invention comprises an input shaft carrying a cylindrical inner race, a fixed cylindrical outer race, and a plurality of planetary rollers disposed between the races, these rollers being carried by a cage connected to an output shaft. The planetary rollers comprise helically wound springs having an unstressed diameter slightly greater than the radial distance between the races, so that the rollers will be compressed diametrically a substantial amount when they are placed between the races.

Slight variations in the surfaces of the races, either in a circumferential or an axial direction, will be compensated for by the coils of the planetary spring rollers, so that full rotational forces will be transmitted at all times. In order to reduce friction between the rollers and the cage, the slots in the cage are lined with roller bearings supported at their ends by ball bearings mounted in the cage.

Referring more particularly to the drawings, the planetary unit is generally indicated at 11 and comprises a housing 12 carrying a ball bearing 13 at one end and a pair of ball bearings 14 and 15 at the other end which are coaxial with bearing 13. An input shaft 16 is rotatably supported by bearing 13 and extends into housing 12, having an inner cylindrical race 17 disposed within the housing. An output shaft 18 is rotatably supported by bearings 14 and 15, and has a shoulder 19 within housing 12.

A cage generally indicated at 21 is disposed within housing 12, this cage having a first part 22 adjacent input shaft 16 and a second part 23 adjacent output shaft 18.

The outer races of four circumferentially spaced ball bearings 24 are mounted within member 22, and the outer races of a similar number of ball bearings 25 are secured within member 23. Four roller bearings 26 extend between members 22 and 23 and are supported by the ball bearings 24 and 25, being secured to the inner races thereof. The races of bearings 24 and 25 are so shaped that relative axial movement between roller bearings 26 and end sections 22 and 23 of the cage will be prevented. These roller bearings, the purpose of which is described below, are disposed within a central section 27 of cage 21, this central section having an inner surface 28 with a diameter somewhat larger than the diameter of race 17 and an outer surface 29. The diameter of surface 29 is somewhat less than the inner diameter of an outer cylindrical race 31 secured within housing 12. Cage section 27 is provided with four relatively small axial bores 32 within which roller bearings 26 are disposed, and four relatively large bores 33 parallel to bores 32 are disposed therebetween. The diameter of bores 32 is substantially less than the radial thickness of member 27, but the diameter of bores 33 is somewhat larger than this thickness. The sizes of the bores are such that they intercommunicate with each other, so that bores 33 will be exposed to bores 32 on both sides. Furthermore, bores 33 will be exposed toward the inner and outer races 17 and 31, respectively.

Four planetary rollers 34 are provided within bores 33. Each of these rollers comprises a helically wound spring having an unstressed diameter slightly larger than the radial distance between inner race 17 and outer race 31. When the rollers are installed, they will therefore be subjected to substantial compressive forces along their radii and be in good frictional contact with the inner and outer races. A pair of thrust bearings in the form of spherical members 35 and 36 are disposed at the opposite ends of each roller 34. The four members 35 are disposed within recesses 37 in member 22, while the four members 36 are similarly disposed in recesses 38 formed in member 23. Member 23 is secured to shoulder 19 of output shaft 18 by bolts 39, so that, in effect, the entire cage 21 is rigidly connected to output shaft 18. A bushing 41 is disposed between input shaft 16 and member 22 of cage 21.

In operation, the rotation of input shaft 16 with inner race 17 will cause rollers 34 to roll along the inner surface of fixed outer race 31. Because of the interconnection between rollers 34 and cage 21, through roller bearings 26 and thrust bearing 35 and 36, cage 21 (and therefore output shaft 18) will rotate about its axis at the same speed as the axes of rollers 34 rotate about said axis.

Because of the construction of rollers 34, any irregularities in the surfaces of inner race 17 or outer race 31 will not hamper the efficiency of force transmittal between the input and output shafts. This applies to both irregularities in a circumferental direction and those in axial direction. The compensating action of the rollers will be due not only to their compressed nature between the inner and outer races, but also to the fact that each roller has many turns of wire which can shift radially with respect to each other. Thus, for example, should there be slight irregularities in an axial direction on the surface of either race 17 or 31, the individual turns of rollers will move radially relative to each other, maintaining full engagement with the race surfaces.

Because of the presence of roller bearings 26, there will be no sliding friction between rollers 34 and member 27 of cage 21. Thrust members 35 will likewise prevent substantial frictional retarding forces between the ends of rollers 34 and members 22 and 23 of cage 21. The diameters of bores 32 and 33 are slightly greater than the diameters of bearings 26 and rollers 34, respectively, thus further avoiding friction.

The relatively large amount of compression to which rollers 34 can be subjected will mean that, even after considerable wear in use, these rollers will still maintain relatively high compressive forces against the inner and outer races, thus maintaining the efficiency of the unit.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a speed changing mechanism of the planetary type, an inner race, an outer race, a cage disposed between said races, a plurality of circumferentially spaced and axially extending rollers rotatably mounted within said cage and engageable with said inner and outer races, each of said rollers comprising a helically wound spring having an unstressed diameter slightly greater than the radial distance between said inner and outer races, whereby said springs will be compressed in a radial direction when disposed between the inner and outer races, said cage having a central section within which said rollers are disposed and two end sections, and spherical thrust members carried by said end sections and engageable with the opposite ends of said rollers.

2. The combination according to claim 1, said cage being further provided with a plurality of roller bearings rotatably mounted therein and disposed between said spring rollers, the spring rollers being in rolling engagement with said roller bearings whereby sliding friction between the spring rollers and cage will be prevented.

3. The combination according to claim 2, said cage having a central section within which said spring rollers and roller bearings are disposed and two end sections, and ball bearings in said end sections rotatably supporting the opposite ends of said rollers bearings.

4. The combination according to claim 3, said ball bearings including means for preventing relative axial movement between said roller bearings and said cage end sections, whereby the roller bearings will serve to interconnect the central and end sections of said cage.

5. The combination according to claim 3, said central cage section being provided with a plurality of relatively small bores within which said roller bearings are disposed and a plurality of relatively large bores within which said spring rollers are disposed.

6. The combination according to claim 3, further provided with a housing within which said races and cage are disposed, an input shaft extending through one end of said housing, an output shaft extending through the opposite end of said housing, a bushing between one of said end cage sections and said input shaft, and means securing said output shaft to said other cage end section.

7. The combination according to claim 6, further provided with a plurality of recesses in said cage end sections, and spherical thrust members disposed within said recesses and engaging the opposite ends of said spring roller.

References Cited

UNITED STATES PATENTS

| 1,071,719 | 9/1913 | Fast | 74—798 |
| 1,298,560 | 3/1919 | Poppink | 74—798 |
| 1,399,443 | 12/1921 | Rennerfelt | 74—798 |
| 2,548,633 | 4/1951 | Stephenson | 74—798 |
| 3,244,026 | 4/1966 | De Kay | 74—798 |

FOREIGN PATENTS 349,137  5/1931  Great Britain.

FRED C. MATTERN, JR., *Primary Examiner.*

THOMAS C. PERRY, *Examiner.*